Inventors:
John Gray and
Gene W. Anderson
By: Dawson, Tilton, Fallon & Lungmus
Attys.

Inventors:
John Gray and
Gene W. Anderson
By: Dawson, Tilton, Fallon & Lungmus
Attys.

3,511,579
CONTROL SYSTEM FOR LIQUID PRESSURE BOOSTER SYSTEMS
John Gray, Oak Park, and Gene W. Anderson, Downers Grove, Ill., assignors to Liquitrol Systems, Inc., Brookfield, Ill., a corporation of Illinois
Filed July 22, 1968, Ser. No. 746,481
Int. Cl. F04b 49/00; F04o 15/00
U.S. Cl. 417—6                                                9 Claims

ABSTRACT OF THE DISCLOSURE

A control system sequences pumps coupled to a common source of varying pressure to maintain the pressure in a discharge conduit at a constant level for all flow rates. The system includes a plurality of constant-speed pumps coupled in common to the source of pressurized fluid. A pressure regulating valve connects the output of each pump to the discharge conduit. A flow transducer, preferably in the input conduit, generates a flow signal when the flow rate through the pumps reaches a predetermined level. A pressure transducer, sensing the discharge pressure of a first, operating pump, generates a pressure signal when the discharge pressure falls below a predetermined value which is set slightly above the desired constant system pressure. Control circuitry energies a second pump when the flow signal indicates that the flow rate is above the predetermined flow rate and the pressure signal indicates that the discharge pressure of the operating pump has fallen below the preset pressure at the pump output.

BACKGROUND

The present invention relates to a control system for sequencing (i.e. selectively energizing or de-energizing) pumps in a liquid distribution system wherein the pumps act to boost the inlet pressure. Such systems are common, for example, in multi-storied buildings wherein the inlet (or suction) pressure may not be sufficient to force water to the upper levels, or if sufficient, will do so at a markedly reduced pressure under high flow conditions. In these systems, the inlet pressure may vary substantially, and such systems are usually engineered for what may be termed a "worst case" conditions—namely, the minimum inlet pressure which the municipality or source will guarantee.

Tankless water pressure booster systems commercially available which are capable of maintaining a constant output pressure irrespective of varying demand rates and varying inlet pressures may be classified into two types. One type, commonly referred to as the variable speed system, senses the actual system pressure and generates an electrical signal which controls the speed of variable speed pumps to maintain a constant system pressure. Additional pumps may be sequenced or brought into operation if the flow rate so demands. Such systems are expensive in that the control equipment required is expensive; however, this type of system is able to take advantage of rises in inlet pressure above the design minimum. That is, the control signal will control the pump speed such that the head generated by the pump will add to the inlet pressure to equal the desired system or output pressure.

The second type of commercial booster systems employs constant speed pumps which, of course, do not require sophisticated control systems. One such system is described in the co-invented U.S. Pat. No. 3,135,282, which issued June 2, 1964. In known constant speed system, pressure regulating valves are interposed between each pump and the outlet conduit so that excess pressure is dropped across the pressure regulating valves in order to obtain the desired constant output pressure. These constant speed systems are not able to take advantage of an increase in inlet pressure; rather, if the inlet pressure increases for a constant flow rate, the additional pressure drop appears across the pressure reducing valve. In addition, some prior constant speed systems sensed the system pressure (i.e. downstream of the pressure regulating valves) to control the actuation of additional pumps. This created a hazard in some circumstances in that the pump might be operating in the cavitation region due to a greater demand.

Another disadvantage in prior constant speed systems is that there tends to be instability in the change-over region where the operation of two pumps overlaps. That is, if a lower capacity pump is operating at near capacity and there is a sudden, or momentary, surge in demand, a higher capacity pump will be energized and the lower capacity pump de-energized. When the momentary surge subsides, the higher-capacity pump will then have to be de-energized and the lower-capacity pump started up again. The surge current required to start the pump is, of course, undesirable; and similar effects have been observed when higher capacity pumps are operating at a lower or minimum capacity and there is a temporary lull in demand.

The inventive system is designed to take advantage of increases in inlet pressure to extend the operating range of the pumps while maintaining a constant system pressure and without the danger of operating any of the pumps in the cavitation region.

SUMMARY

The present invention contemplates the use of a number of constant-speed pumps operating in parallel when energized, with each pump having a pressure regulating valve interposed between its discharge and the system outlet conduit. Means responsive to fluid flow, preferably located in the inlet conduit, generates a signal when the flow rate exceeds a predetermined level. A pressure sensitive switch sensing the discharge pressure generated by the pump as well as the total inlet pressure, including pressures above design minimum, generates a signal when the pump discharge pressure falls below a predetermined level, which level is preset to be slightly above the desired output system pressure. When the discharge pressure of the first pump falls below the preset value and the flow measuring means indicates that the flow rate is above a predetermined level for that pump, control circuitry energizes a second pump. In a preferred embodiment, the second pump has a substantially higher capacity than the first pump so that when it is energized, the first pump may be de-energized. Under these circumstances, a time-delay relay is inserted in the circuitry which de-energizes the first pump so that the second pump will achieve its operating speed before the first pump is shut off.

Thus, the present invention allows the use of constant speed pumps with their attendant simplified control circuitry while taking advantage of increases in inlet pressure above design minimum to extend the operating range of the pumps and preventing operation of the pump in the cavitation region. At the same time, the system reduces repetitive energizing of pumps when thus operating at higher capacity.

Other features and advantages of the instant invention will be apparent to persons skilled in the art from the following detailed description of a preferred embodiment accompanied by the attached drawing wherein identical reference numerals will be used to denote like parts in the various views.

THE DRAWING

DETAILED DESCRIPTION

Figure 1:
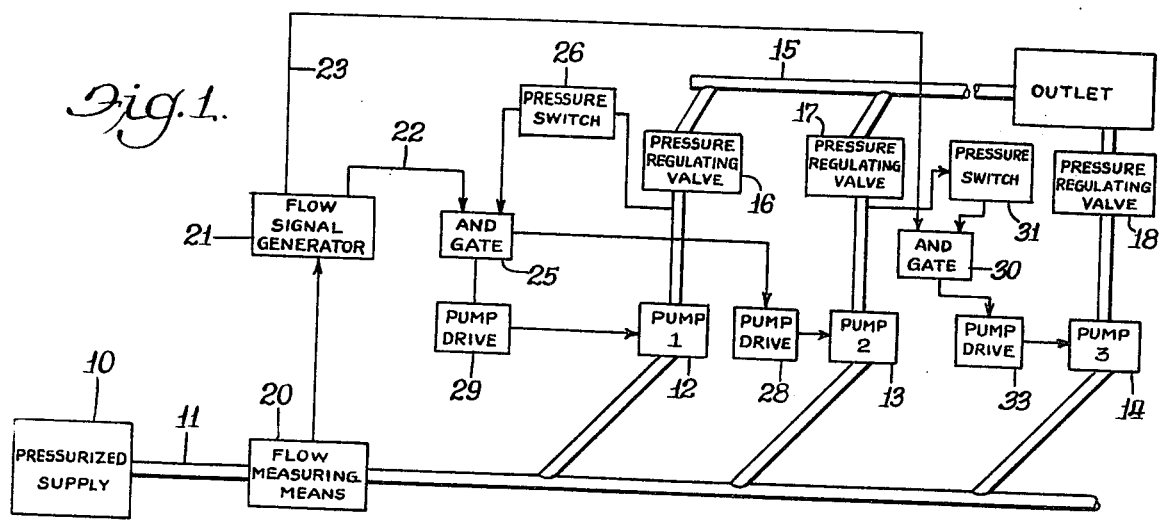
FIG. 1 is a schematic block diagram of a tankless pumping system according to the present invention.

Turning now to FIG. 1, there is seen in block schematic form, a system which incorporates the present inventive concept. A pressurized water supply is designated by reference numeral 10; and coupled to it is an inlet conduit or header 11. Three pumps indicated by reference numerals 12, 13 and 14 respectively receive water from the header 11. Each of the pumps 12–14 is connected in parallel to an output or system conduit 15 respectively by means of pressure regulating valves 16, 17 and 18.

Any number of pumps as well as any combination of different capacities of the pumps may be used with the present invention; however, for clarity of understanding, it will be assumed that the pumps 12, 13 and 14 have capacities which are respectively 25 percent, 55 percent, and 55 percent of the designed system output capacity. Thus, although other combinations could easily be achieved, the illustrated system contemplates that the pump 12 will operate up to 25 percent of system capacity, whereafter pump 13 will be energized and pump 12 de-energized. Above 55 percent of system capacity, pumps 13 and 14 will operate in parallel and simultaneously with pump 12 shut down.

The function of each of the pressure regulating valves 16–18 is to effect a pressure drop from the discharge pressure of its associated pump to maintain the pressure in the outlet conduit 15 at a constant uniform value. Such pressure regulating valves are common in the art; and they usually operate on a hydraulic feedback principle to effect the varying drops across the valve required to maintain a constant system pressure.

A flow measuring means, schematically identified by the block 20, is incorporated in the inlet header 11 and is associated with a flow signal generator 21 which generates an output signal representative of the flow rate in the input header 11. Although it will be appreciated that other arrangements could be used, the flow signal generator 21 ideally has an output line for each predetermined flow rate level at which the system is designed to energize or de-energize a different combination of pumps. For the illustrated embodiment, there are two such output lines designated respectively 22 and 23. When the flow measuring means 20 indicates that the liquid flow rate is above a first preset level (indicative of a 25 percent system capacity) the line 22 is energized to start the pump 13. When the flow further increases to a higher level (55 percent, for example) the line 23 will also become energized to start pump 14, while line 22 remains energized.

Output line 22 of the generator 21 feeds one input of an AND gate 25. The other input of AND gate 25 is received from a preset pressure switch 26 which senses the discharge pressure of the pump 12. The preset pressure switch 26 is set to actuate at a level slightly above the desired output pressure in conduit 15. A first output of the AND gate 25 feeds a pump drive 28 to energize the pump 13 when its two input signals are present. At this time, a pump drive 29 for pump 12 is de-energized. The second output line of the generator 21, namely line 23, feeds one input of a second AND gate 30. The second input of the AND gate 30 is received from a pressure switch 31, similar to the previously-referred-to pressure switch 26; however, the pressure switch 31 is responsive to the discharge pressure of the pump 13. The output of AND gate 30 energizes a pump drive 33 to drive the pump 14.

Under normal conditions when the system is operating at less than 25 percent capacity, only the pump 12 is being driven by its associated pump drive 29. When the flow reaches a predetermined level as sensed by the means 20, the output line 22 of the generator 21 is energized so that one input of the AND gate is energized. However, as previously indicated, it may not be necessary to de-energize pump 12 and energize pump 13 depending upon the value of the pressure in the inlet header 11. If the inlet pressure is above design minimum, so that at this flow rate the desired output system pressure may be maintained, it is advantageous for purposes of efficiency to continue to use pump 12. Thus, the other inlet to the AND gate is not energized unless the pressure switch 26 indicates that the discharge pressure of the pump 12 falls below that pressure which is necessary to maintain the system pressure at its desired value. It will be remembered that the pressure generated by the pump 12 is additive to the suction or inlet pressure so that when both the flow rate has exceeded a predetermined value and the discharge pressure of pump 12 falls below a preset value, the AND gate 25 will be energized to start pump 13.

When the flow rate then exceeds the 55 percent level, line 23 of the flow signal generator 21 is signaled to energize the first input of the AND gate 30. Again, the pressure sensitive switch 31 is responsive to the discharge pressure of the pump 13 so that the pump 14 will be energized only when the discharge pressure of the pump 13 falls below the pressure necessary to maintain the desired system output pressure, in which case, both pumps 13 and 14 continue to operate in parallel.

As will be clear from the subsequent detailed circuit description, in shutting down the pumps, although the pressure switch 31 will remain in an energized state, when the system flow rate falls below the higher of the two predetermined levels, the output lead 23 of the flow signal generator 21 will be de-energized thereby disabling the AND gate 30 and, hence, the pump 14. Similarly, should the flow rate fall below the lower of the two levels, the output lead 22 of the generator 21 will be de-energized to switch the state of AND gate 25 thereby energizing the pump 12 and de-energizing pump 13 after a short period.

It will be appreciated that the schematic elements shown are for the purposes of illustration and that, for example, the AND gates 25 and 30 are merely indicative of the logic function that must be performed independently of the type of circuitry used. For example, in the illustrated embodiment it is preferred that the AND gate 25 have an inherent delay (as with a conventional delay relay) while switching a pump off to allow a pump which had been switched off to achieve running speed before switching the first pump off.

Figure 2:
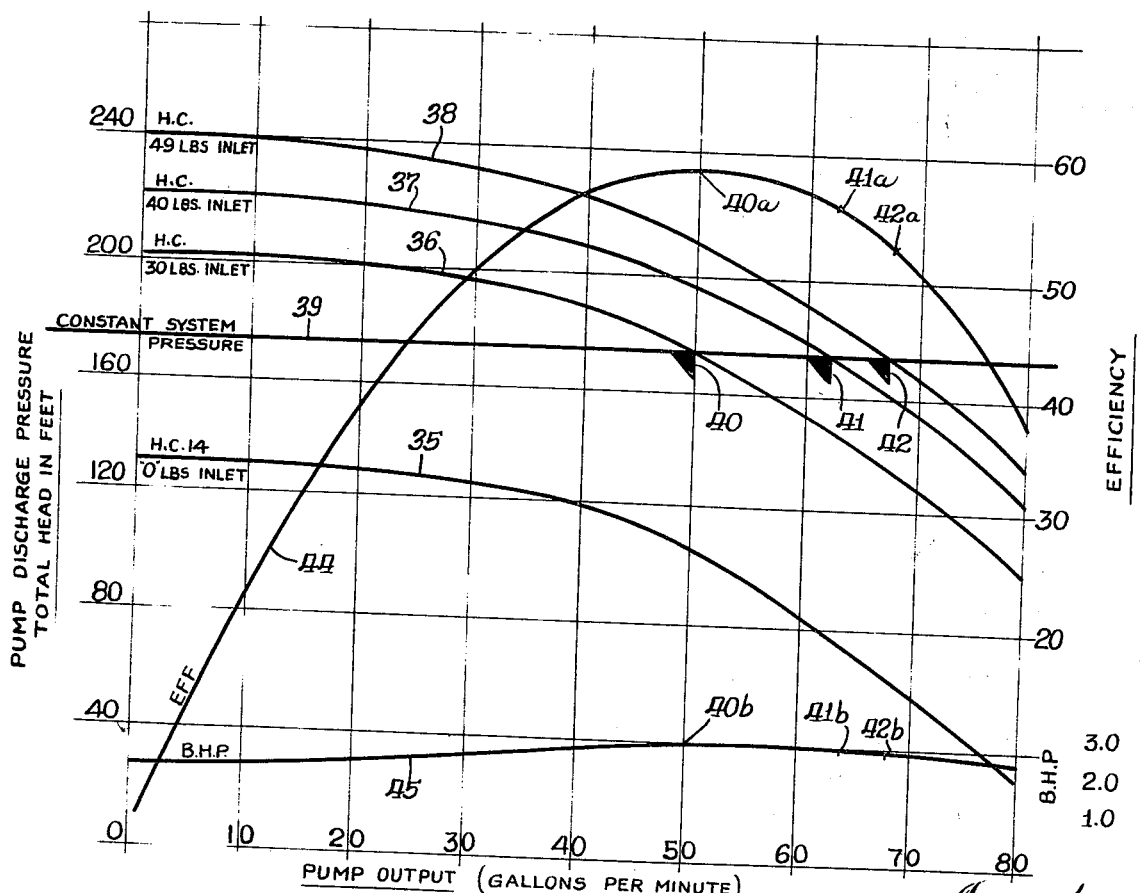
FIG. 2 is a graph showing pump discharge pressure, efficiency, and brake horsepower as the function of the pump output for various inlet pressures.

In order to graphically illustrate the extended operating range of a pump in the present system, reference is made to FIG. 2 in which the abscissa is the system output for one pump in gallons per minute, and representative of a typical pump. The ordinate on the left margin of the graph in FIG. 2 is the pump discharge pressure (or total head in feet). The ordinate indicated by the right-hand margin is representative of both efficiency in percent and brake horsepower of the pump.

A family of operating curves designated respectively by reference numerals 35, 36, 37, and 38 show the relationship between pump discharge pressure and the pump output for different values of inlet or suction pressure. For example, the curve 35 illustrates the operating characteristic for zero pounds of inlet pressure; the curve 36 illustrates the operating characteristic of the pump for thirty pounds of inlet pressure; the curve 37 illustrates the relationship for forty pounds of inlet pressure; and the curve 38 illustrates the relationship for the case in which the inlet pressure is forty-nine pounds per square inch. The constant desired system output pressure is illustrated for purposes of example by the horizontal straight line 39 and taken to be 175 ft. (that is, 75 p.s.i.). Obviously, for an inlet pressure of zero p.s.i., the pump (operating along the characteristic curve 35) is not able to achieve the desired output pressure for any flow rate.

The curve 36 might be representative of the minimum design inlet pressure; and under these conditions, it can be seen from the graph that fifty gallons per minute could be delivered before the pressure falls below the desired system pressure. However, if the inlet pressure rises to forty p.s.i. then (referring to characteristic curve 37) about sixty-two gallons per minute could be delivered by the same pump without the need to switch to a pump of larger capacity. Similarly, if the inlet pressure rises to forty-nine p.s.i., the same pump is capable of discharging sixty-seven and one-half gallons per minute. These three operating points are respectively illustrated by the arrowheads 40, 41 and 42. The efficiency for these three operating points, as indicated along the curve 44 varies with the pump output; and for the three cases illustrated, the values are respectively 59.4 percent, 56.5 percent, and 53 percent.

Similarly, referring to the curve 45, the brake horsepower required for the three operating points (including compensation for pressure control valve friction) are respectively 2.45, 2.40, and 2.35 horsepower.

In a typical prior system employing constant speed pumps, a flow-sensing mechanism would switch to a higher-capacity pump when the flow rate exceeded forty gallons per minute because, as observed from FIG. 2, the system would, at this flow rate, fall below the desired system pressure for the minimum design inlet pressure. As has already been mentioned, such prior systems did not take advantage of the increases in inlet pressure to allow pump operation at full capability over an extended range of suction pressures. Increases in inlet pressure would be dropped across the pressure regulating valve associated with the then-operating pump so that pumps were not allowed to operate at increased capacity when the suction pressure rose. Other prior systems which sequenced the pumps only in response to drops in system pressure were unable to maintain a constant system pressure and raised the possibility of operation in the cavitation region.

DETAILED CIRCUIT DIAGRAM

Figure 3:
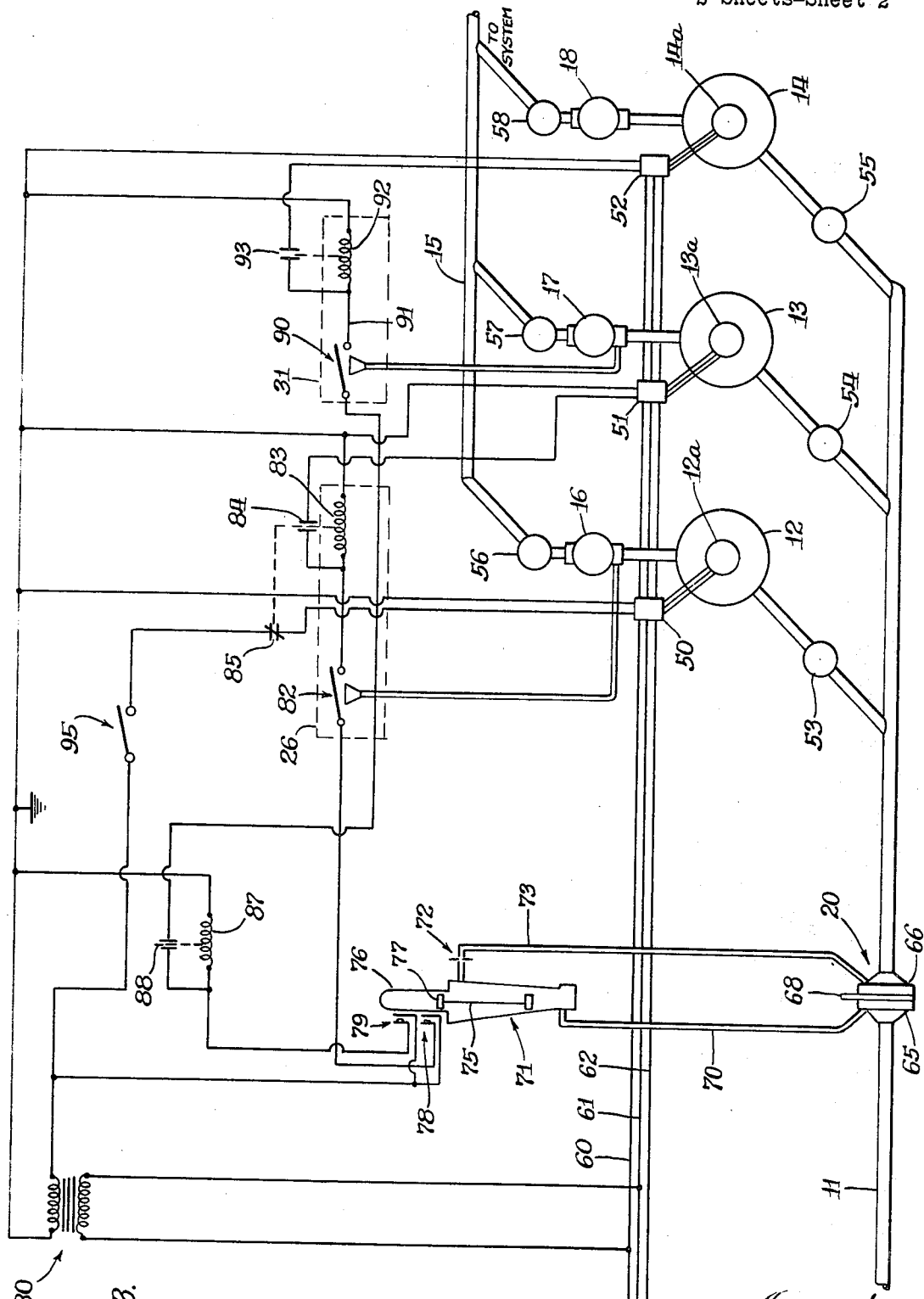
FIG. 3 is a detailed circuit schematic diagram of the system illustrated in FIG. 1.

Turning now to the more detailed circuit schematic diagram of FIG. 3, the inlet header is again designated 11, the flow measuring means generally designated 20, each of the pumps designated respectively 12, 13 and 14 and their respective pressure regulating valves 16, 17, and 18. The pump 12 is driven by a motor 12a which may be a three-phase motor connected to a source (not shown) by means of the starter box 50. Similarly, the pump 13 is driven by a motor 13a which is connected to the source by a starter box 51; and the pump 14 is driven by a motor 14a which is energized through a starter box 52. Shut-off valves designated respectively 53, 54 and 55 are interposed respectively in the inlet conduits to each of the pumps 12, 13 and 14; and check valves 56, 57 and 58 are interposed respectively between the discharge ends of the pressure reducing valves 16, 17 and 18 and the outlet conduit 15. A three-phase source is coupled to three power leads 60, 61 and 62 which are connected to the starter boxes 50, 51 and 52 which, in turn, feed the starters at the motors 12a, 13a, and 14a respectively.

The flow measuring means 20 includes an upstream tapped orifice flange 65 and a similar orifice flange 66 located downstream supporting an intermediate straight-edge orifice plate 68. Equivalent means for measuring flow include a venturi tube, pitot tube or manometer. A conduit 70 connected to the tapped orifice flange 65 is coupled to the bottom connection of a rotameter generally designated 71. The liquid then flows through a bypass orifice 72 and a return conduit 73 to the downstream tapped orifice flange 66. An indicator stem 75 moves vertically in the rotameter 71, the vertical displacement from a reference point being proportional to the pressure differential across the main orifice plate 68 and bypass orifice 72 to thereby indicate the percent of maximum design flow, according to conventional technique.

The rotameter 71 includes an upper wet wall 76 having non-magnetic walls; whereas a cap 77 located at the top of the indicator stem 75 is magnetic. Magnetically-sensitive reed switches 78 and 79, arranged to be vertically spaced from each other, are actuated in the order named as the cap 77 rises responsive to increased flow thus closing sequentially the switches 78 and 79 at a relatively lower and a relatively higher flow rate.

A single-phase transformer 80 has a primary winding connected between the power lines 60 and 61, and one side of its secondary winding is connected in common to one contact of the reed switches 78 and 79. The other terminal of the secondary winding of transformer may be grounded or connected to a system common, if desired.

The other side of the switch 78 is connected to a contact which is part of the pressure switch 26 (enclosed in dashed line in FIG. 3). The other contact of the switch 82 is connected to a coil 83 of a relay having normally open contacts 84 and normally closed contacts 85. The other terminal of the coil 83 is grounded. The switch 82, as indicated, is designed to close when the pressure on the upstream side of pressure regulating valve 16 falls below a predetermined value, which value, as already mentioned, is designed to be slightly above the desired system pressure in outlet conduit 15.

Connected to the other terminal of the switch 79 is a coil 87 of a relay having normally open contacts 88. The other terminal of the coil 87 is grounded; and one of the contacts 88 is connected between the junction of the coil 87 and the switch 79. The other of the contacts 88 is connected to one terminal of a switch 90 of the pressure switch 31. The fixed terminal of the pressure switch 91 is connected to a relay coil 92, the other side of which is grounded. The relay 92 has normally open contacts 93, one of which is connected to junction of the relay coil 92 and the switch 90. The other of the contacts 93 is connected to starter box 52.

An on/off switch 95 is connected in series with the normally closed contacts 85 of the relay 83 between the ungrounded terminal of the secondary winding 89 and the starter box 50. Pump 12 is started by turning on the master switch 95.

The normally open contacts 84 of relay 83 interconnect the junction of the switch 82 and coil 83 to the terminal box 51 which energizes the motor 13a to drive the pump 13.

OPERATION

When the on/off switch 95 is closed, the starter box 50 is energized through the normally closed contacts 85 of the relay 83 to couple energy from the three-phase source to the motor 12a which drives the pump 12. As long as the pump 12 maintains a discharge pressure above the lower limit set in the pressure sensitive switch 26, the contacts 82 will remain open; and the pump 12 will continue in operation with the pumps 13 and 14 de-energized. When the flow exceeds the first level set in the rotameter 71, the reed switch 78 closes but the sequencing of pumps does not occur until the discharge pressure of the pump 12 falls below the level which closes the contacts 82 with the pressure sensitive switch 26. When this occurs (it will be remembered that the closing of the contacts 82 depends upon the pressure in the inlet header 11 as well as the pressure generated by the pump) the relay coil 83 is energized to close the contacts 84 and to open the contacts 85. The opening of the contacts 85 preferably occurs a short time after the actuation of the contacts 84; that is, there is a built-in time delay in the opening of the contacts 85 whereas the contacts 84 close immediately. The closing of the contacts 84 energizes the starter box 51 to energize the motor 13a and start the pump 13. The opening of the contacts 85 a short time later de-energizes the motor 12a of pump 12 after the motor 13a has taken over the load.

With pump 12 thus de-energized, its discharge pressure becomes equal to its inlet pressure so that the contacts 82 will thereafter remain closed until the pump 12 is energized. As long as the discharge pressure on the pump 13 is sufficient to maintain the contacts 90 of the pressure switch 31 open, the final pump 14 is not called into service. With the system in this state (that is only pump 13 operating), if the flow level falls to a point such that the switch 78 opens, the relay coil 83 will be de-energized (despite that the contact 82 remains closed) thereby immediately closing the contacts 85 to energize the pump 12 and, a short time later, opening the contacts 84 to de-energize the pump 13. Thus, both the contacts 84 and 85 of the relay 83 close without delay and open after a short delay.

If, on the other hand, while pump 13 is running, the flow level rises to the level at which the switch 79 closes, the relay coil 87 will be energized to close contact 88. With contacts 88 thus closed, energy is fed to one of the contacts of the switch 90 in pressure switch 31. If the discharge pressure of pump 13 then falls below the level set by the pressure switch 31, the contacts 90 will close and the coil 92 will be energized to close its associated contacts 93. This, in turn, will actuate the motor starter 52 to couple energy to the motor 14a to drive the pump 14; and thereafter, the pumps 13 and 14 will work simultaneously and in parallel.

It will be observed that the pressure switch 31 will thereafter remain closed; however, if the flow level drops below the point represented by the contacts 79, the switch will open and the relay 87 will be de-energized thereby opening the contacts 88 to de-energize the pump 14. The system will then revert to its intermediate stage, the operating during which time has already been described in detail.

It will be apparent to persons skilled in the art that the inventive system has the advantages that regardless of the combination of pumps being in current operation, the control system is able to take advantage of rises in suction or inlet pressure to extend the operating region of the pumps. That is, the pumps are sequenced on in response to drops below a predetermined minimum level in the pump discharge pressure; whereas, the pumps are sequenced off in response to flow conditions. The system has the further advantage that there is no danger of the pumps operating in the cavitation region due to the fact that the pressure drops are sensed at the discharge end of the pump and not at the system outlet conduit.

Having thus described in detail a preferred embodiment of our inventive system, persons skilled in the art will be able to substitute certain system components and to modify the arrangement illustrated without departing from the principle of the invention.

We claim:

1. A tankless pumping system for receiving liquid from a source under varying pressure and supplying the same at a constant desired system pressure over a range of flow rates comprising: a plurality of pumps coupled in parallel to receive liquid from said source and to deliver the same to said discharge conduit, a pressuer regulating valve interposed between the discharge of each pump and the discharge conduit, flow signal means for generating a flow signal when the flow rate of said liquid reaches a predetermined level, pressure sensitive means sensing the discharge pressure of one of said pumps for generating a discharge pressure signal when the sensed discharge pressure falls below a predetermined pressure; and control means for energizing a second of said pumps in response to said flow signal and said discharge pressure signal.

2. The system of claim 1 wherein said control means includes logic circuit means receiving said first flow signal and said second pressure signal for energizing said second pump only when both of said signals occur and for de-energizing said second pump only if one of said flow and discharge pressure signals is removed.

3. The system of claim 1 characterized by sequencing said pump to an energized state in response to said discharge pressure signals and sequencing said pumps to a de-energized state in response to the termination of said flow signal.

4. In a tankless pumping system, the combination comprising a source of liquid under pressure, an outlet conduit for delivering said liquid, a first pump and a first pressure regulating valve in series coupling liquid from said source to said outlet conduit, a second pump and a second pressure regulating valve in series for coupling liquid from said source to said outlet conduit in parallel with said first pump, flow measuring means for generating a flow signal when the flow rate of said liquid exceeds a predetermined value, pressure sensitive means for generating a pressure signal when the discharge pressure of said first pump falls below a preset level, and control means responsive to said flow signal and said pressure signal for energizing said second pump whereby the operating region of said first pump is extended to maintain a desired constant system pressure over a range of inlet pressures while avoiding operation in the cavitation region.

5. The system of claim 4 wherein said control means further comprises delay means for de-energizing said first pump a predetermined time after said second pump is energized, and wherein when said flow signal ceases said second pump is de-energized a predetermined time thereafter.

6. The system of claim 5 further comprising a third pump and a third pressure regulating valve in series for coupling liquid from said source to said outlet conduit in parallel with said first and second pumps, second pressure sensitive mean for generating a second pressure signal when the discharge pressure of said second pump falls below a preset level, and wherein said flow means generates a second flow signal when the flow rate reaches a second, higher predetermined value, said control means including means responsive only to both of said second flow signal and said second pressure signal to energize said third pump.

7. In a method of controlling the sequencing of constant speed pumps connected in parallel and each provided with a pressure regulating valve coupling its associated pump to said outlet to maintain a constant desired system pressure, the steps comprising generating a flow signal representative of a predetermined flow rate, generating a pressure signal representative of a predetermined discharge pressure of an operating pump, and energizing a second pump only when said flow signal exceeds said predetermined rate and said discharge pressure signal is reduced below said predetermined discharge pressure.

8. The method of claim 7 further comprising the step of de-energizing said second pump while energizing said first pump when said flow signal indicates a flow rate below said predetermined flow rate.

9. In a tankless pumping system receiving liquid under pressure for delivering the same to an outlet conduit under a predetermined constant outlet pressure, the combination comprising first pump means including pressure regulating means receiving liquid from said source for delivering the same to said outlet at said constant outlet pressure, second pump means including pressure regulating means for receiving liquid from said source and for delivering the same to said outlet conduit at said constant outlet pressure in parallel with said first pump, flow measuring means for generating a flow signal when the demand exceeds a predetermined value greater than the capacity of said first pump, pressure sensitive means sensing the discharge pressure of said first pump for generating a pressure signal when said discharge pressure of said first pump falls below a preset level above the level of said constant outlet pressure, and control means responsive to both said flow measuring means and said pressure sensitive means for energizing said second pump only when said flow signal indicates that the demand is greater than the capacity of said first pump and the discharge pressure of said first pump is below said preset level whereby said second pump is not called into operation even though the demand may exceed the nominal capability of said first pump provided the discharge pressure of said first pump is sufficiently above said constant outlet pressure to maintain said constant outlet pressure at that demand rate.

References Cited
UNITED STATES PATENTS

| | | | |
|---|---|---|---|
| 2,486,256 | 10/1949 | Bock | 103—11 |
| 2,741,986 | 4/1956 | Smith | 103—11 |
| 2,888,875 | 6/1959 | Bock | 103—11 |
| 2,945,445 | 7/1960 | Smith et al. | 103—11 |
| 3,072,058 | 1/1963 | Christopher et al. | 103—11 |
| 3,369,489 | 2/1968 | Schaub | 103—11 |

WILLIAM L. FREEH, Primary Examiner

U.S. Cl. X.R.

103—25; 417—53